(12) United States Patent
Couvert et al.

(10) Patent No.: US 10,484,514 B2
(45) Date of Patent: Nov. 19, 2019

(54) METHOD FOR DISPATCHING NETWORK FRAMES AMONG PROCESSING RESOURCES

(71) Applicant: KALRAY, Orsay (FR)

(72) Inventors: Patrice Couvert, Saint-Ismier (FR); Marta Rybczynska, Grenoble (FR); Siméon Marijon, Orsay (FR); Yann Kalemkarian, Orsay (FR); Benoît Ganne, Orsay (FR); Alexandre Blampey, Sassenage (FR)

(73) Assignee: KALRAY, Orsay (FR)

( * ) Notice: Subject to any disclaimer, the term of this patent is extended or adjusted under 35 U.S.C. 154(b) by 266 days.

(21) Appl. No.: 14/932,679

(22) Filed: Nov. 4, 2015

(65) Prior Publication Data

US 2016/0134725 A1    May 12, 2016

(30) Foreign Application Priority Data

Nov. 7, 2014   (FR) ..................... 14 60773

(51) Int. Cl.
*H04L 29/06* (2006.01)
*H04L 12/931* (2013.01)
*H04L 12/935* (2013.01)

(52) U.S. Cl.
CPC .......... *H04L 69/22* (2013.01); *H04L 49/3009* (2013.01); *H04L 49/351* (2013.01); *H04L 67/42* (2013.01); *H04L 69/12* (2013.01); *H04L 69/161* (2013.01)

(58) Field of Classification Search
None
See application file for complete search history.

(56) References Cited

U.S. PATENT DOCUMENTS

| | | | | |
|---|---|---|---|---|
| 7,254,639 | B1* | 8/2007 | Siegel | H04L 49/3009 370/389 |
| 7,529,245 | B1 | 5/2009 | Muller et al. | |
| 7,627,743 | B2* | 12/2009 | Su | G06F 9/30043 712/225 |
| 8,243,608 | B2* | 8/2012 | Tausanovitch | H04L 41/0681 370/241.1 |
| 8,629,867 | B2* | 1/2014 | Hickey | G06T 15/005 345/419 |
| 2003/0210686 | A1* | 11/2003 | Terrell | H04L 45/00 370/389 |
| 2005/0256975 | A1 | 11/2005 | Kaniz et al. | |

(Continued)

*Primary Examiner* — Joshua Joo
(74) *Attorney, Agent, or Firm* — Oliff PLC

(57) ABSTRACT

The invention relates to a method of processing data frames arriving on a network interface, comprising the following steps implemented in the network interface: storing a set of target positions (tgtPOS), positions in a frame at which are expected at least one parameter characterizing a subframe (ETH_TYPE) and parameters (SRC_IP, DST_IP) characterizing a client-server session; storing an expected value (xpVAL) for the subframe parameter; receiving a current frame and comparing the value (xtVAL) received at the position of the subframe parameter to the expected value; if equal, calculating an index (IDX) from the values received at the positions of the session parameters; and routing the current frame to a processing resource associated with the index.

10 Claims, 3 Drawing Sheets

(56) References Cited

U.S. PATENT DOCUMENTS

| | | | |
|---|---|---|---|
| 2006/0168270 A1* | 7/2006 | Townsley | H04L 69/168 709/230 |
| 2009/0180477 A1* | 7/2009 | Akahane | H04W 40/005 370/392 |
| 2010/0067538 A1* | 3/2010 | Zhang | H04L 47/10 370/412 |
| 2011/0307608 A1* | 12/2011 | Chang | G06F 9/5033 709/224 |
| 2012/0136889 A1* | 5/2012 | Jagannathan | H04L 49/3009 707/769 |
| 2014/0043964 A1* | 2/2014 | Gabriel | H04L 41/5022 370/229 |
| 2016/0239525 A1* | 8/2016 | Treves | H04L 12/6418 |
| 2017/0085478 A1* | 3/2017 | Berman | H04L 12/4625 |

\* cited by examiner

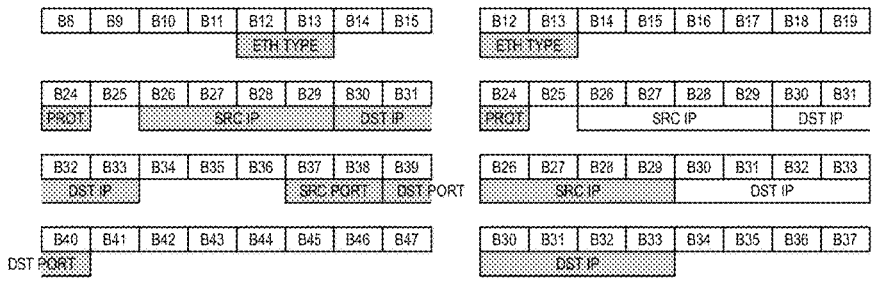
Fig 6A
Fig 6B
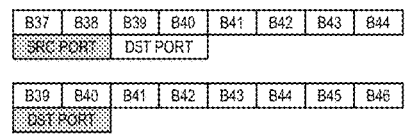
Fig 7
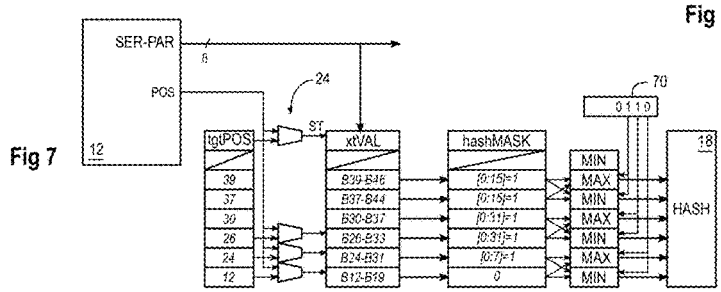
Fig 8
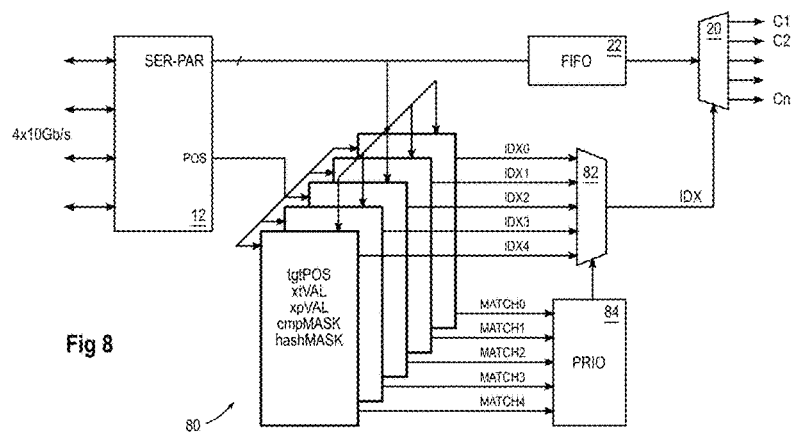

METHOD FOR DISPATCHING NETWORK FRAMES AMONG PROCESSING RESOURCES

FIELD

The invention relates to network processing equipment, especially for Ethernet networks.

BACKGROUND

FIGS. 1A to 1C show an exemplary sequence of headers at the beginning of an Ethernet frame. An Ethernet frame generally includes a series of sub-frames nested hierarchically and corresponding to different layers of the Internet protocol suite.

FIG. 1A illustrates the first header of an Ethernet frame. The Ethernet protocol is a "data link layer" in the Internet protocol suite, such as Token Ring, PPP, HDLC, ATM, Wi-Fi, etc. The first six bytes B0 to B5 convey the destination MAC address, the next six bytes B6 to B11 convey the source MAC address, and bytes B12 and B13 (ETH TYPE) define the protocol of the "network layer" or "Internet layer" nested from byte B14 in the Ethernet frame, such as IP (IPv4, IPv6), ICMP, IPX, etc.

FIG. 1B illustrates a header of an IPv4 subframe that may start at byte B14. The header of an IPv4 frame includes various parameters, in particular the "protocol" identified in byte B24, and the source and destination IP addresses identified in eight bytes B26 to B33. The "protocol" byte defines the "transport layer" nested in the IPv4 frame from byte B37, such as TCP, UDP, or SCTP.

FIG. 1C illustrates a header of a TCP subframe that may start at byte B37. The four bytes B37 to B40 identify the source port and destination port.

The ETH TYPE parameter conveyed in bytes B12 to B13 of the Ethernet frame may also specify that the Ethernet frame contains several subframes of the same hierarchical level as the Ethernet frame, for example multiple Ethernet subframes. This is the case, for example, when the ETH TYPE parameter specifies the TRILL protocol ("Transparent Interconnection of Lots of Links").

FIG. 2 illustrates the beginning of a TRILL frame nested from byte B14 in the Ethernet frame of FIG. 1A. A TRILL frame may convey multiple Ethernet sub-frames, each having a header of the same structure as FIG. 1A. Each Ethernet sub-frame is preceded by a preamble of six bytes, wherein the third and fourth bytes convey a parameter ERBN ("Egress RBridge Name").

An Ethernet frame may in a so-called VLAN mode define virtual local networks. In this case, the ETH TYPE parameter is preceded by one to three four-byte labels used to identify the VLAN.

The IEEE 802.3ba standard provides an Ethernet connection that may, on four twisted-pair cables, reach a data rate of 40 Gbits/s, namely 10 Gbits/s per twisted-pair.

A network interface card capable of fully exploiting this data rate involves significant computing resources, in particular to decode the headers, calculate error checking signatures, extract the packets and direct the packets to their final destinations.

SUMMARY

A method is generally provided for processing data frames arriving on a network interface, comprising the following steps implemented in the network interface: storing a set of target positions, positions in a frame at which are expected at least one parameter characterizing a subframe and parameters characterizing a client-server session; storing an expected value for the subframe parameter; receiving a current frame and comparing the value received at the position of the subframe parameter to the expected value; if equal, calculating an index from the values received at the positions of the session parameters; and routing the current frame to a processing resource associated with the index.

The method may comprise the steps of producing the data of the current frame in fixed size words; when a current word of the frame includes a target position, storing the word in a respective register of an extracted value register bank; configuring an index mask over the extracted value register bank to cancel all values except those at the positions of the session parameters; and calculating the index over the extracted value register bank through the index mask.

The method may comprise the steps of storing expected values for several subframe parameters in an expected value register bank in correspondence with the extracted value registers; configuring a comparison mask over the extracted value register bank to cancel all values except those at the positions of the subframe parameters; and comparing the contents of the extracted value register bank to the contents of the expected value register bank through the comparison mask.

The method may comprise the steps of storing the target positions in respective registers of a target position register bank, respectively associated with the extracted value registers; simultaneously comparing the contents of all target position registers to a current position count of the received frame; and in case of correspondence between the position count and the contents of a target position register, storing the current word of the frame in the extracted value register associated with the target position register.

The method may comprise the steps of providing a plurality of independent dispatching rules, where each dispatching rule uses a set of target positions, an extracted value register bank, an index mask, a comparison mask, and an expected value register bank; setting priorities between the dispatching rules; evaluating in parallel the dispatching rules on a current frame; and using the index produced by the dispatching rule having the highest priority among multiple rules simultaneously satisfied.

The method may comprise the steps of defining the target positions of the session parameters so that each value received at a session parameter position is stored in a distinct extracted value register; and if two extracted value registers are designed to respectively contain a source parameter and a destination parameter, calculating the index using, in the same order, the maximum value of the contents of the two registers and the minimum value of the contents of the two registers.

BRIEF DESCRIPTION OF DRAWINGS

Other advantages and features will become more clearly apparent from the following description of particular embodiments of the invention provided for exemplary purposes only and represented in the appended drawings, in which:

FIG. 6A illustrates exemplary contents of an extracted value register bank, such as produced by the dispatcher of FIG. 5;

FIG. 6B illustrates other exemplary contents of the extracted value register bank;

FIG. 7 is a diagram of an embodiment of a dispatcher that may produce the contents of the register bank of FIG. 6B; and FIG. 8 schematically shows an embodiment of a circuit that may dispatch frames according to several rules.

DESCRIPTION OF EMBODIMENTS

Current network interface cards, whose data rate may be up to 1 Gbits/s, are designed to forward raw frames to the host processor. The host processor then has the burden of processing the frames, such as for extracting the payloads, error management, forwarding data to target services, etc.

With network interface cards according to the IEEE 802.3ba, the data rates may be multiplied by 40. If the host processor were designed to perform the same tasks as for a 1 Gbit card, it could be overwhelmed by the network packet processing and not have resources for its main tasks. For this reason, new network cards have been designed to implement in hardware certain tasks that used to be assigned to the host processor. However, such cards become obsolete when the standards and protocols evolve. There is thus a need for the network card to be programmable so that it can be adapted to changing standards and protocols through a simple firmware update.

Figure 3:
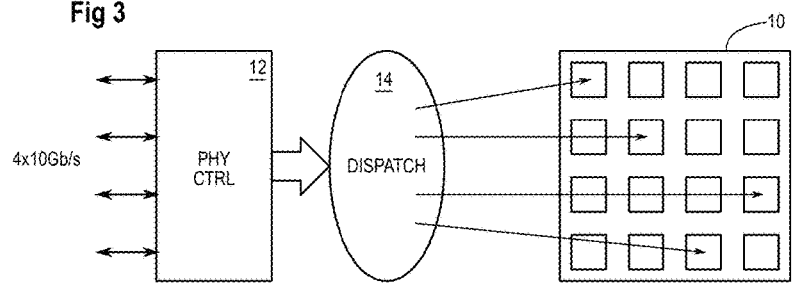
FIG. 3 is a block diagram of a network interface card operating a multi-core processor for processing frames arriving at a high data rate.

FIG. 3 is a block diagram of a 40 Gbit network interface card (NIC) including an embedded multi-core processor 10 designed to unload the host CPU of processing of network packets. The processor 10 may include several hundred cores, such as an MPPA-type processor manufactured by Kalray.

The card further comprises a physical layer control circuit 12 that may integrate the functions of a conventional network card, namely providing and accepting raw Ethernet frames via serial-parallel conversions. The present disclosure focuses on incoming Ethernet traffic that is to be processed with the processor 10. A difficulty in this configuration is to perform optimal and real-time dispatching 14 of the received frames over hundreds of processor cores 10.

The dispatching of frames between multiple processor cores is not trivial. It is not sufficient to assign cores to frames in a round-robin manner, for example. Indeed, it is then likely that several distinct cores end up independently processing data belonging to a same client-server session, whereby the data of this session are split in distinct memory areas allocated to the cores. It is then difficult, or at least costly in resources, to reassemble the data of the session so that they become exploitable.

Figure 1A:
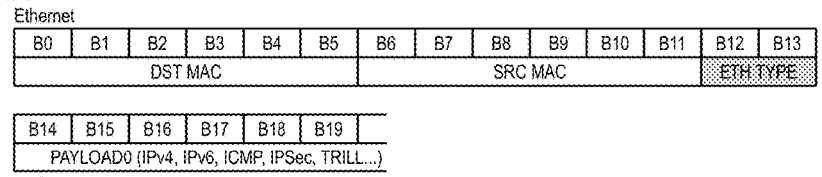
FIGS. 1A to 1C and 2, previously described, represent exemplary headers that may be present in Ethernet frames.
Figure 1B:
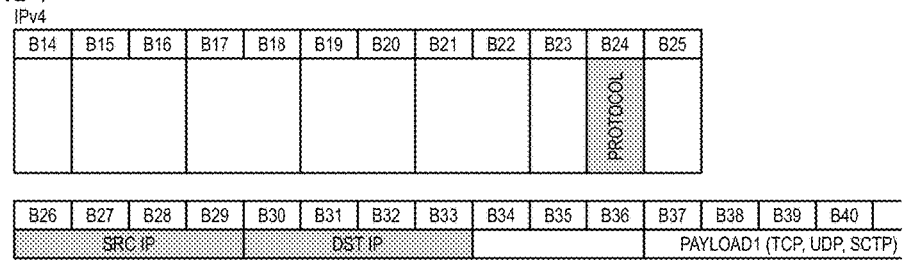
Figure 1C:
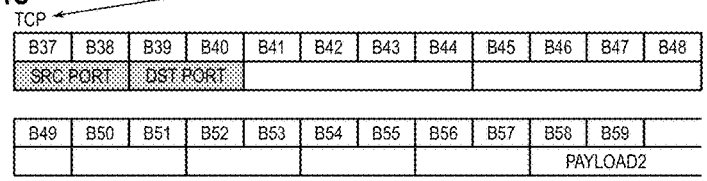
Figure 2:
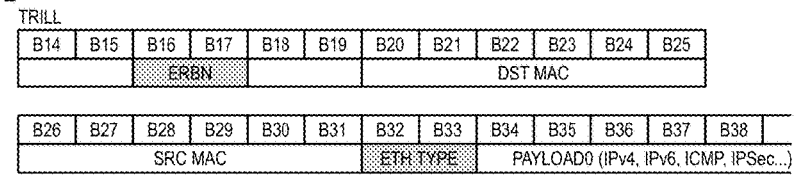
Figure 4:
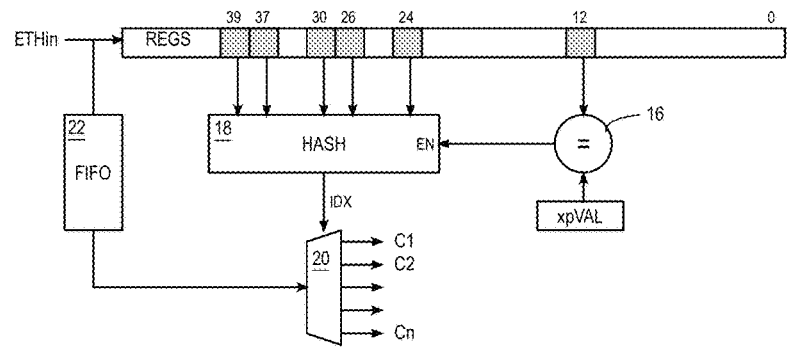
FIG. 4 is a block diagram illustrating a method of dispatching incoming frames to the processor cores.

FIG. 4 is a block diagram illustrating a frame dispatching method implemented by a dispatcher circuit 14. This method is based on establishing a set of dispatching rules that ensures that frames of a same client-server session are always directed to a same processor core. The parameters of a frame that identify a session are protocol dependent. For example, for IPv4 and TCP protocols (FIGS. 1B and 1C), a session may be identified by the protocol (B24), the source IP address (B26-29), the destination IP address (B30-33), the source port (B37-38), and the destination port (B39-40).

In FIG. 4, the circuit implements a dispatching rule for TCP/IPv4 frames, by way of example. Successive bytes of a incoming frame ETHin are written in a series of registers REGS from right to left. The bytes at positions 12 and 13 (ETH TYPE) are compared in 16 with an expected value xpVAL, here the code identifying the IPv4 protocol (0x0800). For TCP/IPv4 frames, the five parameters identifying a session start at bytes 24, 26, 30, 37 and 39. These parameters are provided to a circuit 18 that produces an index IDX through a Hash function. The Hash function is configured so that the index scans the number of processor cores 10. The index IDX selects the destination core of the frame by means of a demultiplexer 20 that receives frames queued in a FIFO memory 22.

Of course, the current frame written in the registers REGS is not necessarily a TCP/IPv4 frame. All frames are systematically written in the registers REGS. The nature of the frame is checked by the comparator 16 that enables the production of the index IDX only if the bytes at positions 12 and 13 (ETH TYPE) identify the IPv4 protocol.

Several similar circuits may be provided in parallel to apply different dispatching rules covering the majority of configurations used in Ethernet frames. Frames with unexpected configurations may be routed for further processing to the host processor.

Figure 5:
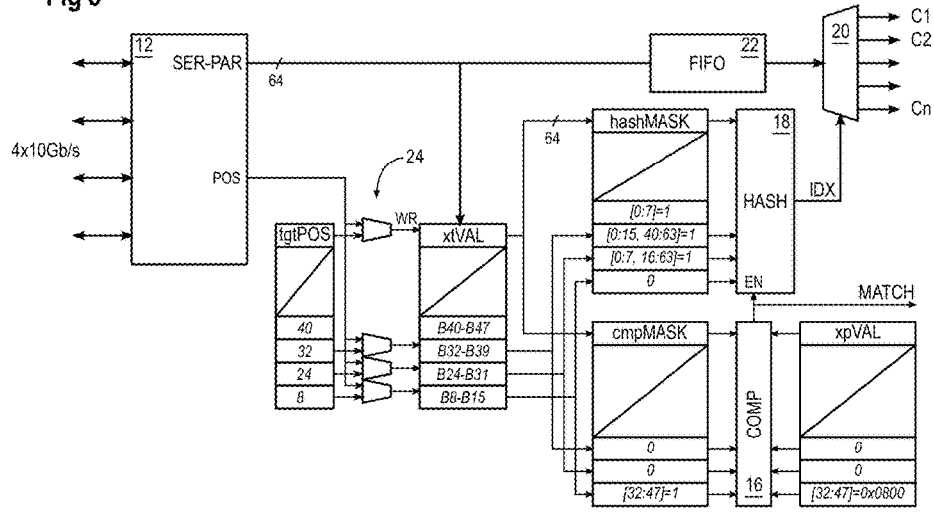
FIG. 5 is a diagram of an embodiment of a dispatcher implementing the principles of FIG. 4.

FIG. 5 shows an embodiment of a dispatcher circuit whose dispatching rules are programmable and that is configured to limit the size of the register set for storing the useful parameters of the frame headers.

The physical layer control circuit 12 performs a serial-parallel conversion of incoming frames and produces, for example, 64-bit words. The circuit 12 may also comprises a counter that produces the position POS of the current word in the frame.

A register bank TgtPOS is configured to receive the frame positions that are to be extracted for analysis, in practice here the positions of the 64-bit words to be extracted. The extracted words are stored in a register bank xtVAL including a 64-bit register for each register of bank tgtPOS.

A set of comparators 24 compares the current position POS produced by the circuit 12 simultaneously to the contents of all registers tgtPOS. In case of equality, the corresponding register xtVAL is selected for writing (WR) to receive the current 64-bit word produced by the circuit 12.

Thus, the registers tgtPOS are designed to identify the 64-bit words containing the parameters to be analyzed for implementing a dispatching rule. Thus, for TCP/IPv4 frames, the 64-bit words at positions 8, 24, 32 and 40 are sought for extraction.

Each register xtVAL therefore contains a series of bytes among which a subset is useful. For example, the first xtVAL register contains eight bytes among which only bytes B12 and B13 are useful, those hypothetically containing the ETH TYPE parameter.

To extract the useful bytes from the xtVAL registers to compare them to expected values xpVAL, a register bank cmpMASK may be provided for defining a comparison mask. Similarly, to extract the bytes used for identifying a client-server session, and therefore to calculate the index, a register bank hashMASK may be provided for defining an index calculation mask.

A pair of cmpMASK and hashMASK registers is associated with each xtVAL register. Each of these mask registers is programmed to contain 1 at the positions of the useful bytes of the xtVAL register, and 0 at the other positions.

Masking may then be performed by a bitwise AND operation between the contents of registers xtVAL and cmpMASK or hashMASK.

In practice, each cmpMASK and hashMASK register may have a single bit for each byte of the corresponding xtVAL register. Then, each bit of the mask register may be hardwired to define all eight bits of a corresponding byte of a 64-bit mask. In other words, a bit k of the mask register (k being an integer ranging from 0 to 7) defines the values of the bits $8k$ to $8k+7$ of the 64-bit mask to be compared with the bits of the corresponding xtVAL register.

In the example of a TCP/IPv4 frame, bits 32 to 47 of the first compare mask, corresponding to bytes B12 and B13 contained in the first xtVAL register, are at 1, and all other bits are at 0. For this purpose, bits 4 and 5 of the first cmpMASK register are set to 1.

In the second hash mask, bits 0 to 7 and 16 to 63 are at 1. For this purpose, bits 0 and 2 through 7 of the second hashMASK register are set to 1.

In the third hash mask, bits 0 to 15 and 40 to 63 are at 1 (the bits 0, 1 and 5 to 7 of the third hashMASK register are therefore set to 1). Finally, in the fourth hash mask, bits 0 to 7 are at 1, all other bits being at 0 (only bit 0 of the fourth hashMASK register is therefore set to 1).

The extracted values contained in the xtVAL registers are passed through the compare mask cmpMASK before they are compared bitwise at 16 with the contents of a register bank xpVAL. An xpVAL register is associated with each xtVAL register and contains the corresponding masked expected value. For example, bits 32 to 47 of the first xpVAL register contain the hexadecimal value 0x0800, code identifying the IPv4 protocol in the ETH TYPE parameter, and all other bits are at 0.

In case of equality, the comparator 16 asserts a MATCH signal that enables the calculation of the index IDX in the circuit 18. The circuit 18 may perform the index calculation based on the integral contents of the xtVAL registers, as masked by the hashMASK registers.

As in FIG. 4, the index IDX selects the destination core for the current frame, waiting in the FIFO 22. The routing of the frame to the corresponding core is illustrated by a demultiplexer 20 controlled by the index IDX. In practice, the processor cores may be arranged in a network-on-chip (NoC) having a limited number of entry points. In this case the data is routed to the cores from any entry point in the NoC, within packets including a header that defines the destination. The routing operation may then involve inserting destinations based on the index values in the NoC packets. For example, the destinations may be provided by an indirection table indexed by the index IDX.

The number of registers in the bank xtVAL is chosen to be sufficient to hold all the Ethernet frame header parameters that can identify client-server sessions. In practice, with existing protocols, a dozen registers is enough.

In the example of IPv4 frames, only one xpVAL register is used. This is because, once the IPv4 protocol is used, the parameters for identifying a session are always in the same position, regardless of the transport layer used (TCP, UDP or SCTP).

Other frame types may involve evaluating multiple parameters before identifying those that may be used to define a client-server session. For example, TRILL frames involve the evaluation of two ETH TYPE parameters at different positions (12, 13, 32, 33).

FIG. 6A illustrates in more detail the contents of the first xtVAL registers, in the example of a TCP/IPv4 frame. Shaded areas indicate the useful parameters and also the bytes that are set to 1 in the mask register cmpMASK (for the ETH TYPE parameters) and the mask register hashMASK (for the other settings). It appears that some registers contain multiple parameters at arbitrary positions and that some parameters straddle two registers. This causes no difficulties, because this arrangement of the parameters is handled seamlessly by adequately configuring the comparison and index calculation masks.

Note also that the filling order of the xtVAL registers depends on the order of the target positions written in the tgtPOS registers. In the examples, the tgtPOS registers were filled in the order of the parameters in the frames. A different order could be used, which would change the index value for the same values of the parameters.

FIG. 6B illustrates another filling mode of the xtVAL register bank. With this filling mode, each parameter is stored at the beginning of a respective xtVAL register. The example of a TCP/IPv4 frame is shown. Each of the six parameters shown in gray, is stored at the beginning of a corresponding register. Given that the size of the registers can cover several parameters, some of the parameters may be duplicated at other positions of the registers, as shown for parameters in white. The masks cmpMASK and hashMASK will be configured to consider only the parameters at the beginning of the registers—the shaded areas correspond to the positions set to 1 in the masks.

FIG. 7 partially shows an exemplary dispatcher circuit configured to implement the filling mode of the xtVAL register bank of FIG. 6B. The control circuit 12 produces frames by 8-bit words or bytes. The position POS produced by the circuit 12 can thus be the position of the current byte in the frame. Each xtVAL register may be associated with a state machine that causes the storing of eight consecutive bytes of the incoming frame as soon as a comparator 24 detects equality between the current position POS and the contents of the associated tgtPOS register.

The filling mode of FIG. 6B enables implementing additional operations on the contents of the xtVAL registers before using them to calculate the index IDX. In particular, it may be efficient in terms of computing resources that the same computing resource processes both directions of a client-server session, i.e. the client requests and server responses. The frames of these two directions differ only by the inversion of the destination and source addresses, and the inversion of the destination and source ports (for IPv4 or IPv6 frames). For the index to have the same value for both directions, and thus ensure that the same computing resource is allocated to both directions, the source and destination positions of the addresses and ports may be exchanged in the frames of one of the directions.

FIG. 7 further shows circuitry offering this functionality. A pair of operators MIN, MAX is assigned to each pair of xtVAL registers. These operators are configured to operate on the values masked through the hashMASK registers. Each MIN operator produces the minimum value of the two associated masked values, and each MAX operator produces the maximum value of the two associated masked values.

Each pair of MIN, MAX operators may be enabled by a bit in a configuration register 70. When the enable bit is at 0, the corresponding operators MIN, MAX are inactive and transmit values unchanged.

With this configuration, by placing the destination and source parameters in the registers associated with the same pair of MIN, MAX operators, the produced index will be the same for the frames of both directions of a same client-server session. The values shown in FIG. 7 correspond to the example of TCP/IPv4 frames. The second and third pairs of MIN, MAX operators are enabled to handle IP addresses and ports.

If a destination/source parameter is too large for an xtVAL register, e.g. a 16-byte IPv6 address that does not fit in a 64-bit register (8 bytes), the target position values in registers tgtPOS may be ordered so that the two parts of the destination/source parameter are stored in two registers of same parity, i.e. in correspondence with the same type of operator MIN, MAX.

The set of registers tgtPOS, xtVAL, xpVAL, cmpMASK and hashMASK as described above makes it possible to design a dispatching rule associated with a single frame category. A "frame category" designates frames according to different protocols that can use the same client-server session parameters. For example, a rule designed for TCP/IPv4 frames applies to all IPv4 protocols, i.e. TCP, UDP and SCTP.

FIG. 8 schematically represents a dispatcher circuit capable of processing several types of Ethernet frames. It comprises several sets of register banks 80, wherein each set may be programmed to process a different category of frames. These sets of register banks may operate in parallel, i.e. each extracts from the current frame values to analyze and produces, where applicable, a respective index (IDX0, IDX1 . . . ). The indexes of different register sets may be provided to a multiplexer 82 that selects the index IDX to use for the destination of the current frame.

The multiplexer 82 is controlled by a priority manager 84 on the basis of equality signals MATCH generated by the sets of register banks. In general, the rules are designed so that only one rule at a time is satisfied. In this case, the circuit 84 selects the index produced by the set of register banks that activates the MATCH signal.

In some cases, two different rules may be established that are satisfied by a same frame, producing two different indexes. In this case, the circuit 84 may be programmed to prioritize between these two rules when both are satisfied, and thus select at 82 the index generated by the rule having the highest priority level.

In processing IP frames (IPv4 or IPv6), with the rules as described so far, the ETH_TYPE parameter was compared with an expected value xpVAL, and an index was established based on five parameters PROTOCOL, SRC_IP, DST_IP, SRC_PORT and DST_PORT. This type of rule will be noted {cmp(ETH_TYPE=IPv4), hash(PROTOCOL, SRC_IP, DST_IP, SRC_PORT, DST_PORT)}.

In some cases, it may be desired to calculate the index differently according to the frame subcategory, for example to allocate more computing resources to more frequent frame subcategories. Thus, for IP frames (IPv4 or IPv6), the following three parallel rules may be established:
1) {cmp(ETH_TYPE=IPv4), hash(SRC_IP, DST_IP)},
2) {cmp(ETH_TYPE=IPv4, PROTOCOL=UDP), hash(SRC_IP, DST_IP, SRC_PORT, DST_PORT)},
3) {cmp(ETH_TYPE=IPv4, PROTOCOL=TCP), hash(SRC_IP, DST_IP, SRC_PORT, DST_PORT)}

With this rule set, any UDP frame simultaneously satisfies rules 1 and 2, and any TCP frame simultaneously satisfies rules 1 and 3. The priorities may then be established to use the highest-ranked rule, i.e. the UDP frames will be processed according to rule 2 and TCP frames according to rule 3. Rule 1 is a "default" rule used for processing frames other than TCP or UDP.

The following rule set could also be established:
1) {cmp(ETH_TYPE=IPv4), hash(SRC_IP, DST_IP)},
2) {cmp(ETH_TYPE=IPv4, PROTOCOL=UDP), hash(SRC_IP, DST_IP, SRC_PORT, DST_PORT)},
3) {cmp(ETH_TYPE=IPv4, PROTOCOL=TCP), hash(SRC_IP, DST_IP, SRC_PORT, DST_PORT)},
4) {cmp(ETH_TYPE=IPv4, PROTOCOL=TCP, SRC_PORT=80), hash(SRC_IP, DST_IP, SRC_PORT, DST_PORT)}

Compared to the previous rule set, a rule 4 was added, similar to rule 3 but that compares the source port SRC_PORT to the value 80, i.e. the standard port for the HTTP protocol.

In this case, any TCP/HTTP frame simultaneously satisfied rules 1, 3 and 4. The frame will be processed according to rule 4, having the highest rank.

In practice, most of the traffic on an Ethernet link can be processed by providing five to eight sets of register banks. The combinations of possible rules that can thus be defined will not address all types of frames. Such frames, that are exceptional or represent a low traffic may be routed to a default core, or to the host processor.

What is claimed is:

1. A method of processing data frames arriving on a network interface, the method comprising the following steps implemented in the network interface:
   storing a set of subframe and session parameter positions for a frame, including positions of a subframe parameter and of a set of session parameters;
   storing an expected value for the subframe parameter;
   receiving a current frame in fixed size words;
   when a current word of the current frame overlaps a position among the stored parameter positions, storing the current word in a respective register of an extracted parameter register bank;
   configuring an index mask for cancelling all data of the extracted parameter register bank except data at the positions of the set of session parameters;
   calculating an index from the index mask;
   comparing data received at the position of the subframe parameter to the expected value; and
   if the comparison is equal, routing the current frame to a processing resource associated with the index.

2. The method of claim 1, further comprising the steps of:
   storing expected values for several subframe parameters in an expected parameter register bank in correspondence with registers of the extracted parameter register bank;
   configuring a comparison mask for cancelling all data of the extracted parameter register bank except data at the positions of the subframe parameters; and
   comparing the extracted parameter register bank as modified by the comparison mask to the expected parameter register bank.

3. The method of claim 1, further comprising the steps of:
   storing the subframe and session parameter positions in respective registers of a parameter position register bank, respectively associated with registers of the extracted parameter register bank;
   simultaneously comparing all the registers of the parameter position register bank to a current position count of the current frame as the current frame is being received; and
   in case of correspondence between the current position count and a given register of the parameter position register bank, storing a current word of the current frame in a register of the extracted parameter register bank associated with the given register of the parameter position register bank.

4. The method of claim 2, further comprising the steps of:
providing a plurality of independent dispatching rules, where each independent dispatching rule uses a set of parameter positions, an extracted parameter register bank, an index mask, a comparison mask, and an expected parameter register bank;
assigning respective priorities to each independent dispatching rules of the plurality of independent dispatching rules;
evaluating in parallel the plurality of independent dispatching rules on a current frame;
producing in parallel a respective index for each independent dispatching rule; and
using an index produced for a respective dispatching rule having the highest priority among multiple rules simultaneously satisfied from the plurality of independent dispatching rules.

5. The method of claim 1, further comprising the steps of:
defining the parameter positions of the set of session parameters so that each data item received at a position of the set of session parameters is stored in a distinct register of the extracted parameter register bank; and
if two registers of the extracted parameter register bank contain a source parameter and a destination parameter in the set of session parameters of a current frame, calculating the index in a manner that provides a same result when contents of the two registers are exchanged.

6. A method of dispatching frames arriving on a network interface among processing resources, comprising the following steps implemented in the network interface:
splitting a current received frame in fixed size words;
storing words wholly or partially containing selected parameters in respective registers of a register bank, wherein the selected parameters are not aligned with word boundaries;
configuring a comparison mask for cancelling all data of the registers except data at positions of a first subset of the selected parameters;
configuring an index mask for cancelling all data of the registers except data at positions of a second subset of the selected parameters;
calculating an index from the index mask;
associating a processing resource with the calculated index;
comparing an output of the comparison mask to a set of expected values; and
if the comparison is equal, routing the current received frame to the processing resource associated with the index.

7. The method of claim 6, further comprising the steps of:
providing a plurality of independent dispatching rules, where each independent dispatching rule uses a respective register bank, a respective index mask, a respective comparison mask, and a respective set of expected values;
assigning respective priorities to each independent dispatching rule of the plurality of independent dispatching rules;
evaluating in parallel the plurality of independent dispatching rules on a current frame;
producing in parallel a respective index for each independent dispatching rule of the plurality of independent dispatching rules; and
using an index produced for a respective independent dispatching rule having the highest priority among multiple rules simultaneously satisfied from the plurality of independent dispatching rules.

8. The method of claim 6, wherein the frames are Ethernet frames and the selected parameters include an Ethernet type and a set of session parameters including a protocol, a source address, and a destination address.

9. The method of claim 8, wherein the comparison mask isolates at least the Ethernet type, and the index mask isolates at least the session parameters.

10. The method of claim 8, further comprising the steps of:
storing the source and destination addresses in two distinct registers of the register bank; and
calculating the index using the source address and the destination address always in an identical order.

* * * * *